US009601008B2

(12) United States Patent
Talstra et al.

(10) Patent No.: US 9,601,008 B2
(45) Date of Patent: *Mar. 21, 2017

(54) DETECTION USING TRANSMISSION NOTIFICATION

(71) Applicant: PHILIPS LIGHTING HOLDING B.V., Eindhoven (NL)

(72) Inventors: Johan Cornelis Talstra, Eindhoven (NL); Hendricus Theodorus Gerardus Maria Penning De Vries, Mierlo (NL); George Frederic Yianni, Eindhoven (NL); James Joseph Anthony McCormack, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,720

(22) Filed: Oct. 6, 2014

(65) Prior Publication Data

US 2015/0022325 A1 Jan. 22, 2015

Related U.S. Application Data

(63) Continuation of application No. 13/380,536, filed as application No. PCT/IB2010/052739 on Jun. 17, 2010.

(30) Foreign Application Priority Data

Jun. 23, 2009 (EP) .................................... 09163436

(51) Int. Cl.
*H04Q 5/22* (2006.01)
*G08C 23/04* (2006.01)
(Continued)

(52) U.S. Cl.
CPC ............ *G08C 23/04* (2013.01); *G08C 17/02* (2013.01); *H05B 37/0272* (2013.01);
(Continued)

(58) Field of Classification Search
None
See application file for complete search history.

(56) References Cited

U.S. PATENT DOCUMENTS 5,243,430 A 9/1993 Emmons
7,417,556 B2 8/2008 Ling
(Continued)

*Primary Examiner* — Curtis King
(74) *Attorney, Agent, or Firm* — Meenakshy Chakravorty

(57) ABSTRACT

A remote controller is arranged for selecting a light source among a plurality of light sources. The remote controller has an omnidirectional transmitter and is arranged to instruct, by means of the omnidirectional transmitter, the light sources to transmit a directional signal comprising a code, which is unique for each light source. Further, the remote controller has a directional signal receiver, and is arranged to receive the directional signals from the light sources, and signal comparison circuitry connected with the directional signal receiver. The remote controller is arranged to select one of the light sources on basis of the received directional signals. Furthermore, the remote controller comprises a transmission indicator, which is arranged to generate an indication signal, indicative of a successful omnidirectional transmission, and it is arranged to initiate the selection of one of the light sources by means of the indication signal.

10 Claims, 4 Drawing Sheets

(51) Int. Cl.
*G08C 17/02* (2006.01)
*H05B 37/02* (2006.01)

(52) U.S. Cl.
CPC ..... *G08C 2201/51* (2013.01); *G08C 2201/70* (2013.01); *G08C 2201/71* (2013.01)

(56) References Cited

U.S. PATENT DOCUMENTS

| | | | | |
|---|---|---|---|---|
| 2002/0071161 | A1 | 6/2002 | Perkins et al. | |
| 2003/0107888 | A1* | 6/2003 | Devlin et al. | 362/233 |
| 2004/0226529 | A1 | 11/2004 | Nantz et al. | |
| 2005/0200499 | A1* | 9/2005 | Di Peppe | 340/870.28 |
| 2007/0043453 | A1* | 2/2007 | Buil | 700/65 |
| 2007/0293190 | A1 | 12/2007 | Ota | |
| 2008/0238885 | A1 | 10/2008 | Zachut et al. | |
| 2009/0016735 | A1 | 1/2009 | Schmitz et al. | |
| 2009/0026978 | A1 | 1/2009 | Robinson | |
| 2009/0051823 | A1* | 2/2009 | Tsurumoto et al. | 348/734 |
| 2010/0060418 | A1* | 3/2010 | Tarizzo | G08C 17/02 340/5.83 |
| 2010/0109850 | A1* | 5/2010 | Kovach et al. | 340/10.32 |
| 2012/0135692 | A1 | 5/2012 | Feri et al. | |
| 2013/0108275 | A1* | 5/2013 | Knutson et al. | 398/107 |

* cited by examiner

DETECTION USING TRANSMISSION NOTIFICATION

CROSS REFERENCE TO RELATED APPLICATIONS

This application is a continuation application filed under 35 U.S.C. §120 and claims priority to U.S. patent application Ser. No. 13/380,536, filed Dec. 23, 2011, which is a National Stage application of PCT/IB10/52739, filed Jun. 17, 2010 and claims priority thereto under 35 U.S.C. §371 and 35 U.S.C. §365(c), which itself claims priority to European Application No. EP 09163436.0, filed on Jun. 23, 2009. The entireties of these disclosures are hereby incorporated by reference.

FIELD OF THE INVENTION

The present invention relates to selecting a light source among a plurality of light sources by means of a remote controller.

BACKGROUND

In a lighting system having several individual light sources which are capable of communicating with a remote controller, a desired control feature is to be able to control the light output of an individual light source merely by pointing at it with the remote controller and operating a control mechanism, such as buttons or the like.

However, in order to make this work, the remote controller has to be able to identify which one of the light sources the user is actually pointing at. Methods have been developed where each light source transmits a different code in a directional signal by means of modulating its ordinary light output or by means of modulating a separate code transmitting element, such as an IR-LED (InfraRed Light Emitting Diode) or a radio frequency transmitter, e.g. a 60 GHz directional transmitter. The code most prominently received, according to some criterion, by the remote controller is selected. For example the criterion can be "smallest angle of incidence" or "strongest optical signal", etc.

For example, the publication WO 2007/095740 discloses a lighting system where each light source is configured to emit a beacon signal representative of the unique identifier, i.e. code, thereof on command of a remote controller. That is, the remote controller transmits an instruction to the light source that commands the light source to transmit the beacon signal, which is a directional signal. The beacon signal is integrated into the light emitted by the ordinary light source. The remote controller is configured to receive the light and extract the beacon signal therefrom. There are problems with such a lighting system.

One problem is related to synchronization. The remote controller commands several light sources to transmit their codes at the same time. In order for the remote controller to be able to separate the received codes from each other it is equipped with circuitry for correlating the optical signals received from different light sources in one way or the other. In order to obtain a reliable result in determining which light source is the most prominent one, it is desirable that the optical signals are received by the remote controller at an anticipated point of time, and substantially simultaneous.

There exist several sources of time differentiation. Inter alia, there is a variance in the time it takes for the instruction to be generated by the remote controller and actually leave its transmitter. For example the processing of the instruction can be interrupted by other processes in the remote controller. Furthermore, there is a variance in the time the transmitter of the remote controller has to wait to put the instruction into the air. Most popular current wireless transmission systems for remote control are built on the IEEE.802.15.4 standard, such as the ZigBee standard, which employs CSMA-CA (Carrier Sense Multiple Access—Collision Avoidance). In this form of multiple access, the transmitter has to wait for other transmissions to finish before putting its own message in the air. This is called "back-off". Whether there will be none, one or several back-offs is unknown at the time of instruction generation. These variances cause undesired jitter in the time that the codes are actually detected by the remote controller.

SUMMARY

It is an object of the present invention to overcome or at least reduce these problems, and to provide a remote controller and a method at a remote controller which eliminate or at least decrease the jitter.

This object is achieved by a remote controller as defined in the claims, and a method at a remote controller as defined in the claims. It should be noted that for the purposes of this application the signal comparison circuitry is to be interpreted as any circuitry that is capable of performing comparison operations on the signals with respect to some property and to select the most prominent signal thereof.

Since the transmission indicator initiates the selection of a light source the reception of the directionally signaled codes in the remote controller is not affected by the varying internal time delays on the transmitting side of the remote controller.

In accordance with an embodiment of the remote controller, the indication signal is used to initiate the operation of at least one correlator comprised in the remote controller. Thereby, the likelihood that the correlator receives the adequate signals is high.

In accordance with an embodiment of the remote controller, each code consists of a sequence of one or more code symbols, and the remote controller is arranged to instruct the light sources to transmit the code symbols at different times, one code symbol at a time. When using this way of transmitting the codes symbol by symbol, which as such adds advantages, the initiation of the selection operation with the transmission indication signal is even more useful.

In accordance with an embodiment of the remote controller, the codes are generated by the remote controller and provided to the light sources.

In accordance with another aspect of the present invention there is provided a method of selecting a light source among a plurality of light sources by means of a remote controller. This method provides advantages corresponding to those of the remote controller.

It is noted that the invention relates to all possible combinations of features recited in the claims.

BRIEF DESCRIPTION OF THE DRAWINGS

These and other aspects of the present invention will now be described in more detail, with reference to the appended drawings showing embodiments of the invention.

DETAILED DESCRIPTION

Figure 1:
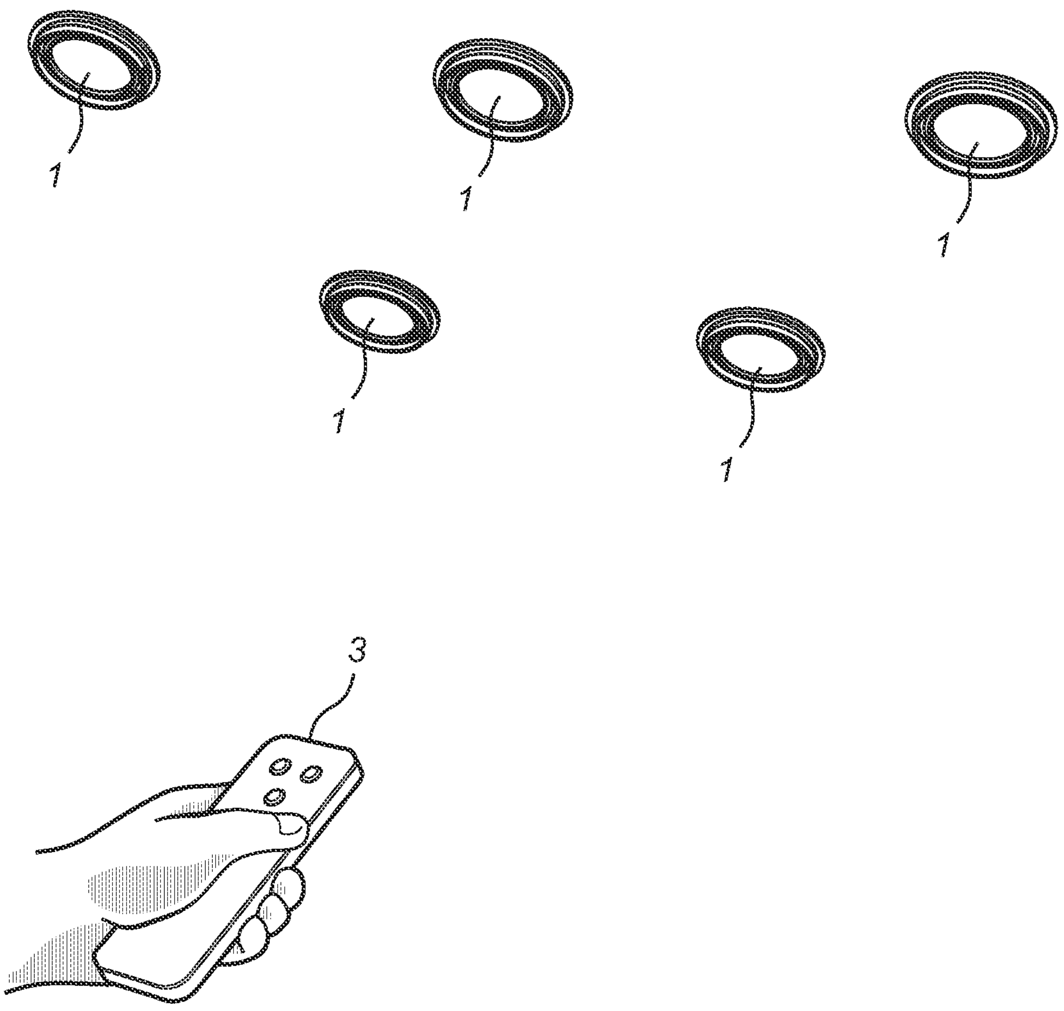
FIG. 1 a schematic illustration of a lighting system.

Referring to FIG. 1, an embodiment of a lighting system according to this invention comprises several light sources (LS) 1, and a remote controller (RC) 3, which is used to control the settings of the light sources.

Figure 2:
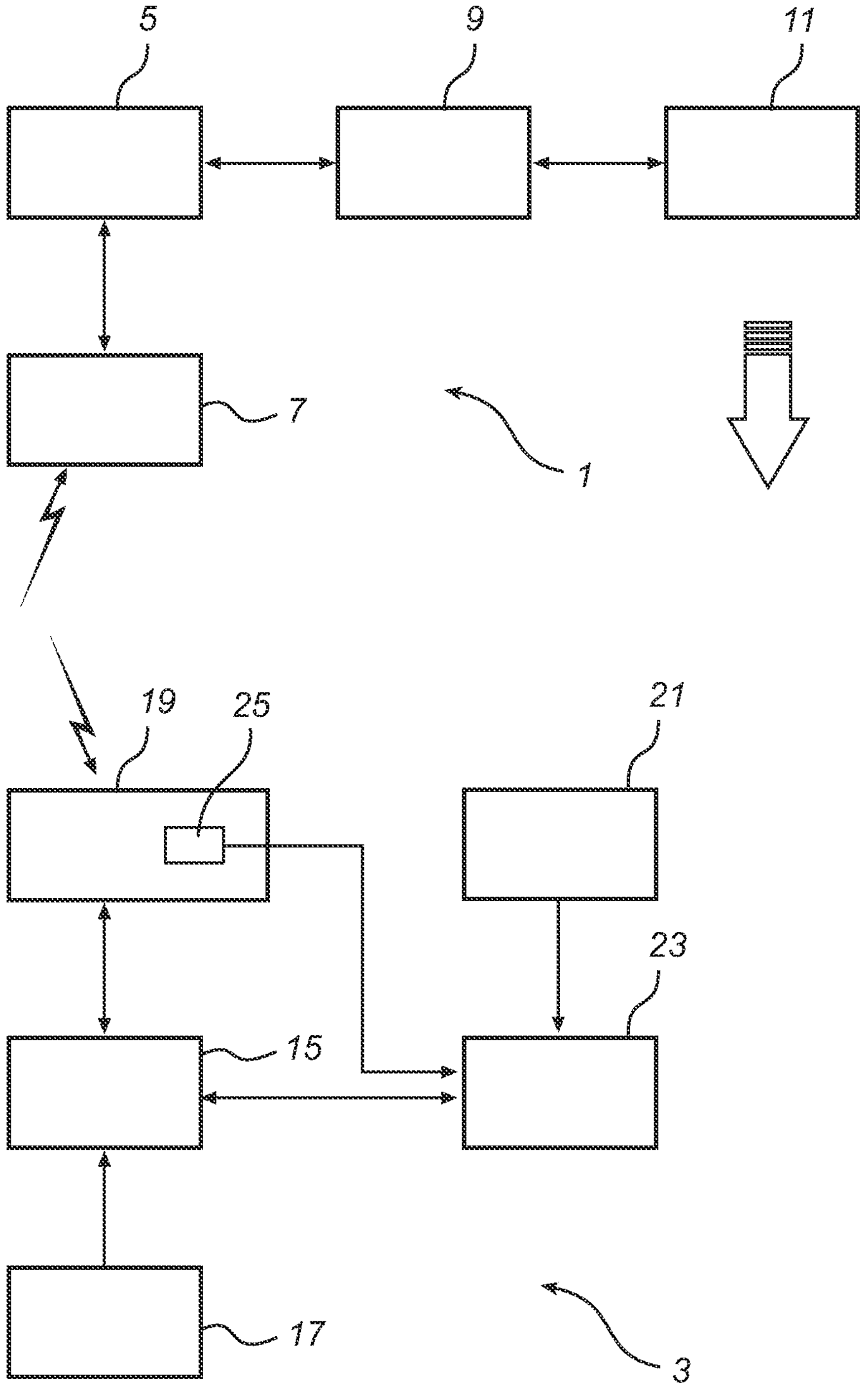
FIG. 2 is a schematic block diagram of an embodiment of a remote controller according to this invention.

In order to explain the communication between the remote controller 3 and the light sources 1 FIG. 2 shows a block diagram of an embodiment of the remote controller (RC) 3 as well as a light source (LS) 1. The light source 1 comprises a control unit 5, an RF (radio frequency) module 7, connected with the control unit 5, a light element driver 9, connected with the control unit 5, and a set of light elements 11, including at least one light element, connected with the light element driver 9.

The remote controller 3 comprises a control unit 15, a control mechanism 17, connected with the control unit 15, an omnidirectional transmitter, which in this embodiment is an RF (Radio Frequency) transmitter comprised in an RF module 19 in conjunction with a radio receiver, connected with the control unit 15, and a directional signal receiver, here an optical receiver, 21, connected with the control unit 15. The control mechanism 17 includes a user interface, such as a touch screen or a number of push buttons. The remote controller 3 is arranged to communicate with the light sources via on the one hand RF communication by means of the RF modules 7, 19, over an omnidirectional channel, and on the other hand optical communication by means of the light elements 11 and the receiver 21, over a directional channel, which is also unidirectional from the light source 1 to the remote controller 3. Furthermore, the remote controller 3 comprises signal comparison circuitry 23, connected to the optical receiver 21 and to the control unit 15, and a transmission indicator 25, which is comprised in the RF module 19, and connected to the signal comparison circuitry 23.

According to an embodiment of the method of controlling the lighting system, when the user points at a light source 1 and pushes a control button to change the settings of the light source 1, the remote controller 3 starts communicating with several light sources 1 via wireless radio communication by means of the RF module 19. The several light sources 1 represent all or a subgroup of the light sources 1 in the lighting system. More particularly, the remote controller 3 omnidirectionally transmits instructions to the light sources 1 telling them to transmit the directional signal, which is here an optical signal, comprising a code unique for each light source 1. The different codes are included in the transmitted instruction. In this RF communication the remote controller 3 employs basic identification, or addresses, unique for each light source 1 and generated at manufacture. This is per se known to the person skilled in the art, and for example such addresses are called MAC addresses. The remote controller 3 learns about these addresses in a previous commissioning which will be described below.

As explained above, there is a delay between the generation of the instruction in the controller 15, and the very transmission of the instruction from the RF module 19. The duration of this delay is difficult to predict and varies due to the factors, which have also been explained above. However, when the radio signal carrying the instruction actually leaves the RF module 19, the transmission indicator detects the transmission and generates an indication signal. The transmission indicator feeds the indication signal to the signal comparison circuitry 23, where the indication signal will initiate the selection operation to start. Thus, when receiving the indication signal the signal comparison circuitry 23 knows that there has been a successful radio transmission and starts the signal selection operation.

Figure 4:
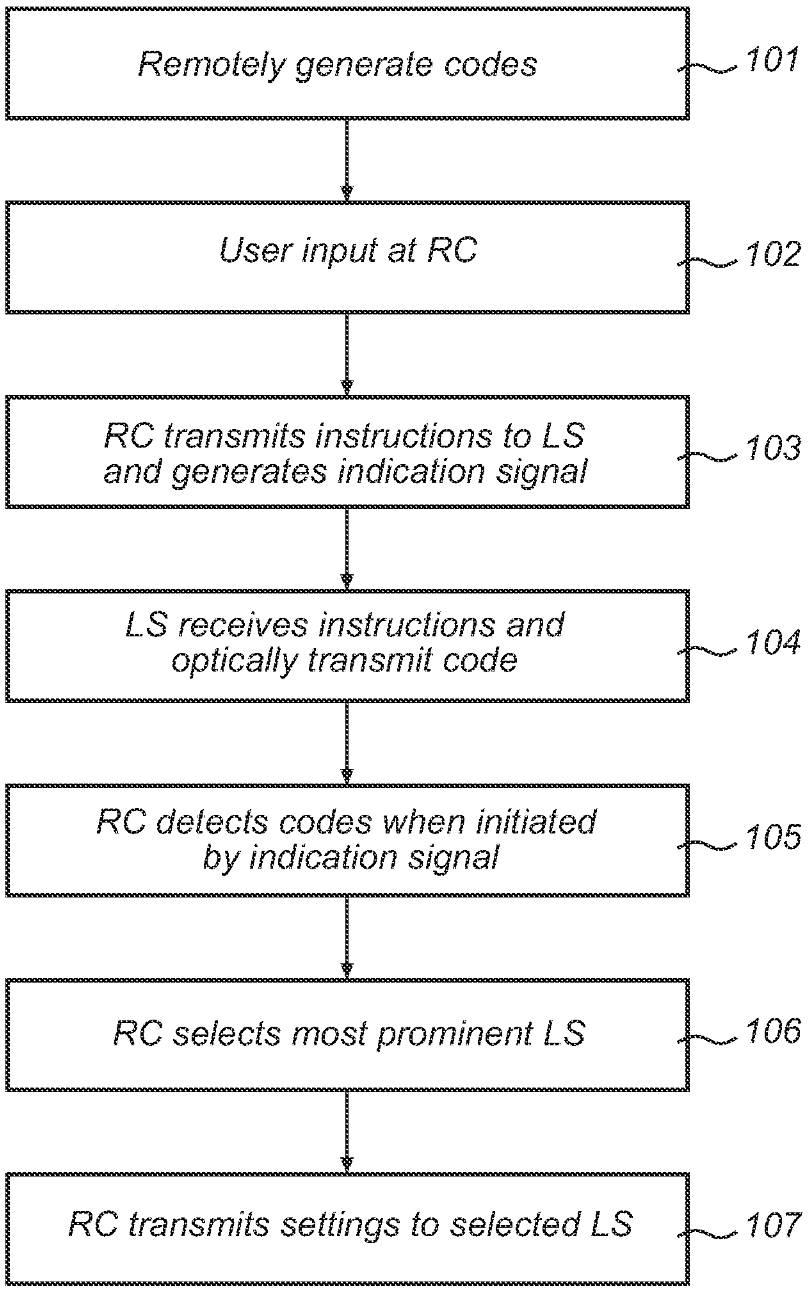
FIG. 4 is a flow chart of an embodiment of the method of selecting a light source according to this invention.

Referring to the flow chart of FIG. 4, in one embodiment of the method the codes are generated remotely of the light sources (LS) 1, in a step 101. In this embodiment it is the remote controller (RC) 3 that has generated the codes, but alternatively the lighting system can comprise a central device which generates the codes and sends them to the remote controller 3. When the user points at a light source with the remote controller 3 and pushes a button 17 to set the light output, the following procedure is executed. The remote controller 3 receives, in step 102, the user input and omnidirectionally transmits, by means of its RF module 19, the codes to the light sources 1 together with a command to transmit the codes, while generating the indication signal, step 103. When each light source 1 receives the transmit command and the respective individual code at its RF module 7, it directionally transmits the code as received by means of the set of light elements 11, i.e. as an optical signal, step 104. Then the remote controller 3 in turn receives the optical signals at the optical receiver 21, detects the codes, step 105, and performs a selection procedure to recognize which light source 1 the remote controller 3 is pointing at, step 106. When a light source 1 has been selected, the remote controller 3 transmits the new settings to that light source 1, step 107.

According to another embodiment, the codes consist of code symbols, which also are called chips. The remote controller 3 transmits one symbol at a time to the light sources 1. This is advantageous in that the demands on the capability of the light sources can be kept comparably low, since they only have to transmit a single symbol, i.e. a fraction of a code, rather than a full code. As an example, assume that the remote controller 3 has generated two different code symbols S1 and S2, where S1="0", and means "no light", and S2="1", and means "full light", and assume that each code consists of four symbols. Further, assume that there are three light sources, LS1, LS2 and LS3 and that the remote controller has generated codes c1={S1,S1,S2,S2}, c2={S1,S2,S1,S2} and c3={S2,S1,S1,S2} for LS1, LS2, and LS3, respectively.

When the user pushes the setting button the remote controller 3 instructs the light sources 1 to transmit their respective first symbol by transmitting the command {LS1 transmit S1, LS2 transmit S1, LS3 transmit 52} via the omnidirectional channel. Each respective light source directionally transmits its symbol. When the symbol is actually transmitted from the remote controller the indication signal is generated and used as described above. The remote controller 3 measures the detected response.

The remote controller 3 instructs the light sources 1 to transmit their second symbol with the command {LS1 transmit S1, LS2 transmit S2, LS3 transmit S1}. Again the remote controller 3 measures the detected response. This is repeated until all symbols have been RF transmitted and optically received by the remote controller 3.

The remote controller 3 is able to finally decide, according to some criterion, as exemplified below, which one of the light sources 1 is most prominent, and this light source is decided to be the one the remote controller 3 is pointing at.

Finally, the remote controller transmits the new settings to the selected light source.

Figure 3:
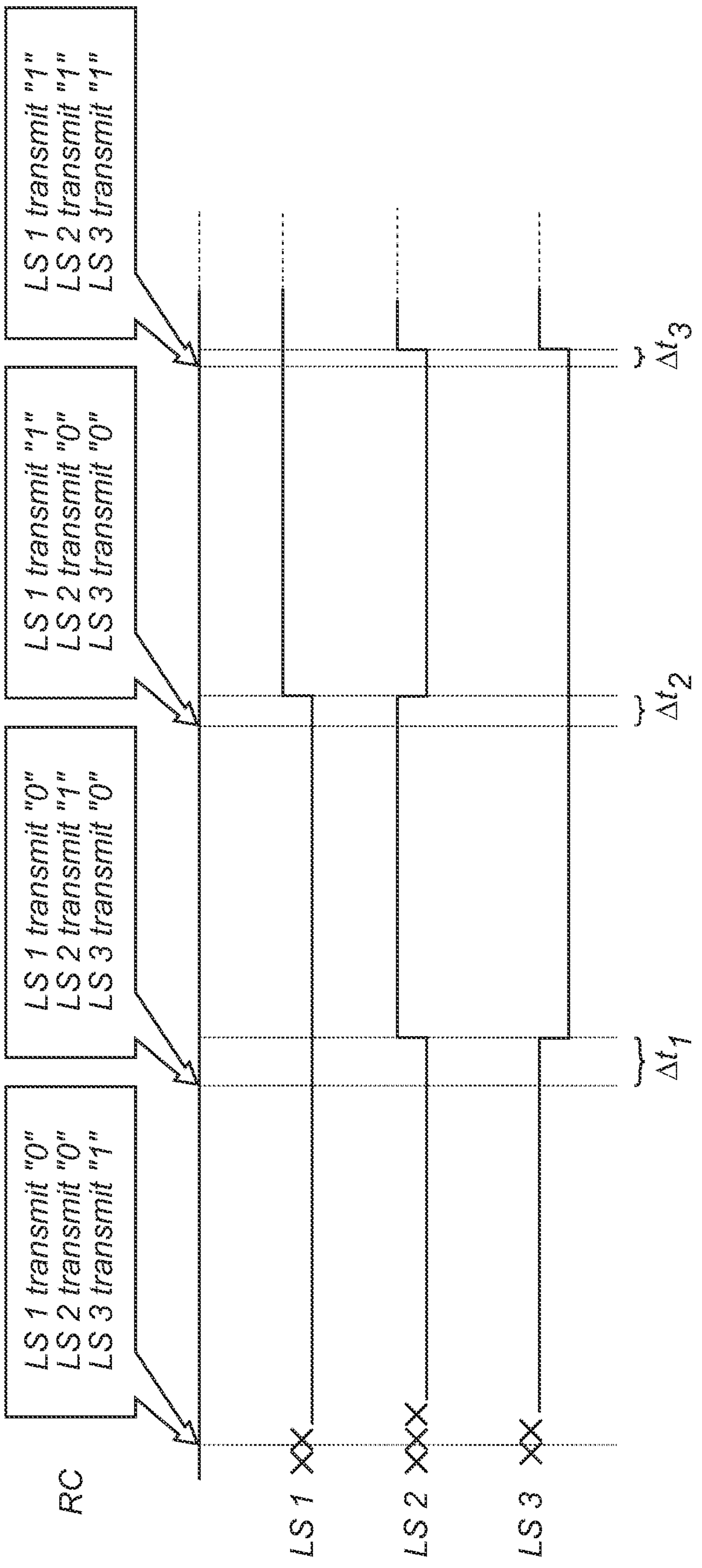
FIG. 3 is a timing diagram illustrating transmission in the lighting system.

A timing diagram for this example of selecting a light source is illustrated in FIG. 3. Because the remote controller 3 determines when the symbols are to be transmitted, the lighting system, on a general level, is automatically synchronous. This is said about the operation at large. Looking at a very accurate time scale, as explained above, in practice some delays will occur in the remote controller, but also in the processing of commands in the light sources 1. However, in comparison with the time variances in the remote controller, which are remedied by the present solution, the delays in the light controller are small, and additionally they are more predictable since the time variance is small as well. Therefore the comparison circuitry can start operating at once when receiving the indication signal. However, as an alternative it is imaginable to introduce a minor offset counted from the reception of the indication signal at the comparison circuitry, in order to ascertain that the codes or code symbols are actually being received at the optical receiver 21 when making the very measurement. The time delays and the variance thereof are illustrated in FIG. 3 denoted as Δti.

Further, the light sources do not need to know about codes, since they simply transmit the symbols when and as they are commanded by the remote controller 3. This means that the light sources 1 do not need to know about how many other light sources there are in the system, etc. As the remote controller 3 determines the lengths of the symbols, or chip-rate, the light sources 1 neither need to know about orthogonal and non-orthogonal codes.

As an optimization, in accordance with an embodiment of the method the commands to the individual light sources to transmit their nth code symbol are combined into a single broadcast, rather than in m separate messages to m light sources. This minimizes the delays in the arrival time that exist on any wireless channel. In a further optimization, the broadcasts following a first broadcast to complete the codes could contain only the changes with respect to the previous broadcast. For example, referring to the above example and FIG. 3, the remote controller 3 would transmit {LS1:S1; LS2:S1;LS3:S2}, {LS2:S2;LS3:S1}, {LS1:S2;LS2:S1}, {LS2:S2;LS3:S2}.

A further feature that is applicable is to define a "back-to-normal" command that the remote controller 3 would transmit after the last symbol has been transmitted, since the light sources 1 do not know whether a particular symbol will be the last one. When receiving the "back-to-normal" command, the light sources 1 will return to their setting prior to the first code symbol broadcast. The advantage is that the remote controller 3 does not have to send a separate message to every light source 1 to return it to its previous setting. In addition, or as an alternative, there also is a time-out such that the light sources 1 automatically return to their original setting if they have not received a code symbol broadcast command for a predetermined time period, which for instance can be in the order of one or a few seconds.

As regards the measurements and calculations performed by the remote controller 3 on the received optical signals from the light sources 1, they can be performed according to any useful presently known or future method. For example, a known method is based on measuring an angle of incidence, where the light source having the smallest angle of incidence is selected by the remote controller 3, as disclosed e.g. in non-published application PCT/IB2009/052363. Another method is based on light intensity, where the light source having the strongest intensity is selected by the remote controller 3. For that matter, the signal comparison circuitry 23 comprises a correlator for performing correlation operations on the received optical signals.

Before the user can start setting the light sources 1, some basic exchange of information has to take place between the remote controller 3 and the light sources 1. This is done during a commissioning phase. During commissioning the remote controller 3 acquires information about the number of light sources in the lighting system, about their inherent identification details, and about what their capabilities are. This information is used for generating appropriate codes and code symbols, which preferably, but not necessarily, should be chosen so as to obtain as short codes as possible, or codes which are efficient for some other reason. When generated, the remote controller 3 transmits information about the code symbols to the light sources. Thus, for example in accordance with an embodiment, the commissioning phase is as follows.

1. The light sources are powered up.
2. Each light source 1 broadcasts, by means of its RF module, a message over the omnidirectional channel saying that it needs to be commissioned. The light source 1 includes its basic identification, such as a MAC address.
3. The remote controller 3 queries the light sources what their capabilities are, while employing the basic identification. For instance, the remote controller 3 may query each light source about what PWM frequencies the light source can create, what its minimum/maximum light output intensity is, etc.
4. Taking into account the capabilities of the light sources 1, the number of light sources to accommodate, and its own receiver type, the remote controller 3 determines a set of appropriate symbols and a set of codes.
5. The remote controller transmits the definition of the symbols, which is also called an alphabet, to the light sources 1. For embodiments where the remote controller instructs the light sources to transmit the whole code in one operation, instead of a symbol at a time, the remote controller additionally provides every light source with its respective code.

It is presently preferred that these commissioning steps are executed at the initial startup of the lighting system and in case the alphabet has to be changed when a new light source is added to the lighting system. However, it is only necessary to change the alphabet when the number of light sources grow beyond a certain threshold. Therefore most of the time steps to 1 to 5 adapted to the addition of a single new light source are performed, since the rest of the light sources already have the necessary information. They only have to be updated when the current set of codes cannot accommodate one more light source.

There are alternative ways of performing the commissioning. For instance, the commissioning can take place each time a light source is turned on.

As regards the transmission technology as such, both for the RF communication and for the optical communication, the general knowledge of the person skilled in the art is useful and adequate, and therefore it will not be described in detail herein. However, it should be mentioned that for an application where the remote control is able to set a PWM (Pulse Width Modulation) frequency and duty cycle in the light sources it would be advantageous to use TDMA (Time Division Multiple Access), FDMA (Frequency Division Multiple Access), or CDMA (Code Division Multiple Access) codes for the optical transmission. In such an application, for instance, the light sources 1 can have LED (Light Emitting Diode) light elements, and more particularly R, G, and B LED light elements. Anyhow, in order to transmit the codes from the light sources 1, some kind of modulation of the light output is performed, such as the on-off modulation used in the above example, or an amplitude modulation. The kind of modulation is chosen, as understood by the skilled person, as far as possible such that the user does not perceive any flicker in the emitted light.

The person skilled in the art realizes that the present invention by no means is limited to the preferred embodiments described above. On the contrary, many modifications and variations are possible within the scope of the appended claims. In addition to those mentioned above, some further examples are as follows.

According to an alternative embodiment, the RF modules used for omnidirectional communication, in the remote controller and in the light sources, are instead IR (Infra Red) modules.

According to an alternative embodiment, the directional transmission from the light sources to the remote controller is performed by means of IR devices, such as IR LEDs. A further alternative is to employ RF directional transmitters, such as 60 GHz RF transmitters. For instance these alternatives are applicable when the light source is an incandescent lamp, which is too slow to be directly modulated.

The invention claimed is:

1. A remote controller arranged for selecting a light source among a plurality of light sources, comprising:

- the remote controller including an omnidirectional transmitter and arranged to instruct, by the omnidirectional transmitter, the light sources to transmit a directional signal including a code, which is unique for each light source, each code including a light source ID;
- the remote controller including a directional signal receiver operable to receive the directional signals from the light sources;
- the remote controller further including signal comparison circuitry connected with the directional signal receiver arranged to select one of the light sources on basis of the received directional signals;
- the remote controller including a transmission indicator which generates an indication signal within the remote controller indicative of a successful omnidirectional transmission;
- the remote controller configured to initiate the selection of one of the light sources only after generation of the indication signal within the remote controller; and
- the remote controller configured to recognize by a selection procedure which of the plurality of light sources the remote control is directed towards.

2. The remote controller according to claim 1, wherein the signal comparison circuitry comprises at least one correlator connected to an output of the transmission indicator for receiving the indication signal.

3. A method of selecting a light source among a plurality of light sources by a remote controller, comprising:

- instructing through omnidirectional transmission, the light sources to each transmit a directional signal including a code which is unique for each light source, each code including a light source ID;
- receiving the directional signals from the light sources;
- selecting one of the light sources on basis of the received directional signals;
- generating an indication signal within the remote controller indicative of a successful omnidirectional transmission; and
- initiating the selection of one of the light sources only after generation of the indication signal within the remote controller; and
- recognizing by a selection procedure which of the plurality of light sources the remote control is directed towards.

4. The method according to claim 3, wherein said initiating the selection of one of the light sources includes initiating a correlation of the received directional signals.

5. A method of selecting a light source by a remote control, comprising:

- transmitting omni-directionally by a remote control a command to retransmit a plurality of codes, wherein the codes are unique for each of a plurality of light sources, each code including a light source ID;
- generating an indication signal at the remote control indicating the successful transmission of the codes;
- receiving by the remote control a directional signal from the light sources which includes a respective code for the respective light source, wherein the remote control measures an angle of incidence or level of light intensity of the received directional signals; and
- recognizing by a selection procedure which of the plurality of light sources the remote control is directed towards.

6. The method of claim 5 wherein the codes include symbols.

7. The method of claim 5 wherein the selection procedure includes utilizing a correlator.

8. The method of claim 5 wherein the remote control measures the detected responses from each of the plurality of light sources after transmission of each of the codes.

9. The method of claim 5 wherein the recognizing by a selection procedure includes measuring time delays and variances between generation of the indication signal and the received directional signals.

10. The method of claim 5 further including combining the codes to include only changes for each of the codes with respect to a prior broadcast group of codes.

* * * * *